United States Patent
Goeschel et al.

(10) Patent No.: US 10,883,261 B2
(45) Date of Patent: Jan. 5, 2021

(54) WASTE TRANSFER UNIT

(71) Applicant: MAG Aerospace Industries, LLC, Carson, CA (US)

(72) Inventors: Christoph Goeschel, Seattle, WA (US); Martin Pieramico, Seattle, WA (US); Thomas Lee, Coto de Caza, CA (US); James W. Pomeroy, Kirkland, WA (US); Mohan Mittur, Bothell, WA (US)

(73) Assignee: MAG Aerospace Industries, LLC, Carson, CA (US)

( * ) Notice: Subject to any disclaimer, the term of this patent is extended or adjusted under 35 U.S.C. 154(b) by 19 days.

(21) Appl. No.: 16/361,833

(22) Filed: Mar. 22, 2019

(65) Prior Publication Data

US 2019/0292765 A1   Sep. 26, 2019

Related U.S. Application Data

(60) Provisional application No. 62/646,944, filed on Mar. 23, 2018.

(51) Int. Cl.
| | | |
|---|---|---|
| *E03F 1/00* | (2006.01) | |
| *E03F 5/10* | (2006.01) | |
| *B64C 1/14* | (2006.01) | |
| *B64D 11/04* | (2006.01) | |

(52) U.S. Cl.
CPC ............ *E03F 1/006* (2013.01); *B64C 1/1453* (2013.01); *E03F 5/105* (2013.01); *B64D 11/04* (2013.01)

(58) Field of Classification Search
CPC ........ E03F 1/006; E03F 5/105; B64C 1/1453; B64D 11/04
USPC ................... 4/313, 316, 623, 627, 629, 312
See application file for complete search history.

(56) References Cited

U.S. PATENT DOCUMENTS

| | | | |
|---|---|---|---|
| 2,076,950 A | 4/1937 | Koch | |
| 2,725,575 A | 12/1955 | Colonna | |
| 2,750,599 A | 6/1956 | Colonna | |
| 6,223,361 B1 | 5/2001 | Rozenblatt | |
| 2017/0073954 A1* | 3/2017 | Lor | ........................ E03D 1/003 |

FOREIGN PATENT DOCUMENTS

| | | |
|---|---|---|
| EP | 0931720 A2 | 7/1999 |
| EP | 2949459 A1 | 12/2015 |
| EP | 3210888 A2 | 8/2017 |
| WO | 2002014148 A1 | 2/2002 |

OTHER PUBLICATIONS

International Patent Application No. PCT/US2019/023624, International Search Report and Written Opinion, dated May 27, 2019.

* cited by examiner

*Primary Examiner* — Tuan N Nguyen
(74) *Attorney, Agent, or Firm* — Kilpatrick Townsend & Stockton LLP (57) ABSTRACT

Systems and methods for managing waste (including liquid, solid, and mixed waste) without using a sink, worktop, or countertop disposal feature. Specific examples provide particular use in connection with an aircraft or other vehicle galley, lavatory, or any other location in which waste that requires disposal is generated. The disclosed embodiments may be installed in an initial galley or lavatory, or they may be used to retrofit an existing environment, such that an entire new disposal system or new sink footprint is not required.

30 Claims, 8 Drawing Sheets

WASTE TRANSFER UNIT

CROSS REFERENCE TO RELATED APPLICATIONS

This application claims the benefit of U.S. Provisional Application Ser. No. 62/646,944, filed Mar. 23, 2018, titled "Waste Transfer Unit," the entire contents of each of which are hereby incorporated by reference.

FIELD OF THE DISCLOSURE

Embodiments of the present disclosure relate generally to systems and methods for managing waste (including liquid, solid, and mixed waste) without using a sink, worktop, or countertop disposal feature. Specific examples provide particular use in connection with an aircraft or other vehicle galley, lavatory, or any other location in which waste that requires disposal is generated. The disclosed embodiments may be installed in an initial galley or lavatory, or they may be used to retrofit an existing environment, such that an entire new disposal system or new sink footprint is not required.

BACKGROUND

In passenger transportation environments, it is often necessary to dispose of unwanted fluids and solids. Most commercial aircraft and other passenger transportation vehicles are equipped with galley and lavatory sinks, however, these sinks are primarily intended for the disposal of liquid waste only. It is often the case that these sinks terminate at the drain mast of the aircraft (or other vehicle) for exhaustion of the liquids to the atmosphere. This presents multiple challenges. First, when the liquids to be disposed of are dark and potentially staining, such as wine, coffee, and so forth, expelling the liquids to the outside of the aircraft can cause the liquids to "paint" the aircraft sides. This can result in an unsightly streak, staining the aircraft and potentially damaging a "clean aircraft" image and leading to increased maintenance/cleaning cost on the ground. Another problem is that disposing of many liquids to the atmosphere is not environmentally friendly. A further problem is that the lines leading between the sink drain and the drain mast are often small in diameter, and if any solid or slurry material is poured into the sink, it can lead to clogging of the drain line. Accordingly, traditional sink systems are limited in their ability to dispose of more viscous liquid or solid waste products.

Other types of trash are also generated on vehicles and need to be disposed of properly. For example, in addition to liquid or slurry-type waste, it is also common that solid waste such as paper towels, cups, napkins, food remnants, and other types of solid waste need disposal within the aircraft or other vehicle environment. Often, separate trash bins or trash compactors are used. These waste disposal solutions take up valuable galley or other countertop/worktop space. They can also add considerable weight to the aircraft. Improvements are thus desirable.

Some attempted solutions have included developing a vacuum galley waste disposal system. These disposal systems function much like an aircraft vacuum toilet. Not only can they dispose of liquid, but they can also flush food waste. Current systems, however, require an entire disposal system to be installed. They do not use the existing sink space in the galley. Instead, they occupy valuable countertop space inside the galleys. Galley disposal systems also generally include a lid to help reduce sound generated by the vacuum flush. They are manually activated by the user depressing a flush switch or button located near the sink. They also create a somewhat loud flushing sound, which can be a nuisance to passengers and crew seated near or working in the galley. These systems are also similar to toilets in that they typically have a rinse valve/rinse ring incorporated into the basin.

Improvements to waste disposal and transfer in connection passenger transportation vehicles is thus desired.

BRIEF SUMMARY

The present inventors have designed a system that allows for disposal of waste into a unit that fits into a standard container space provided on an aircraft. This allows the unit to be integrated visually with the galley, without taking up valuable worktop/countertop space. The disclosed system cooperates with and delivers the received waste material to the main waste system on-board the vehicle. This is typically an aircraft main waste tank, but it should be understood that the main waste system may also be associated with a marine vessel, a recreation vehicle tank, or any other appropriate vehicle system. The system may use a manual flush, an automatic flush, a periodic or a time delayed flush. In other examples, the system automatically flushes after the door is closed. The system may also be touchless.

The disclosed system combines the functionalities of a galley sink, a galley waste disposal unit, but occupies only the front space envelope of a container compartment. In one example, there is provided a waste transfer unit, comprising: a waste receiving portion comprising an opening for receiving waste; and a unit body supporting a waste-side conduit and a flush valve, wherein the waste receiving portion is configured to tilt, hinge, or slide away from the unit body in order to receive waste, and wherein the received waste is transferred to a main waste tank via vacuum. The unit body may have a vacuum-side conduit. The flush valve may be positioned between the waste-side conduit and the vacuum-side conduit. The waste transfer unit is configured to be installed above or below a work surface. The unit may also have a rinse line and/or a vent line.

The waste receiving portion may have a grip area. There may be a sensor for touchless operation. The waste transfer unit may also have an attachment bracket for installation. There may be a handle positioned on an upper wall for ease of transport of the unit. Vacuum for the unit may be generated by differential air pressure on an aircraft or via a vacuum generator. The unit may comprise a housing. The unit be installed on board a passenger aircraft.

In use, closing of the waste receiving portion automatically activates the flush valve or activates a periodic or delayed flush. Closing of the waste receiving portion creates an automatic lock between the unit body and the waste receiving portion until a flush has completed.

This disclosure also relates to a method for transferring waste on board a transportation vehicle comprising a main waste tank, comprising: installing a waste transfer unit on the vehicle, the waste transfer unit, comprising: a waste receiving portion comprising an opening for receiving waste; and a unit body enclosing a waste-side conduit, a vacuum-side conduit, and a flush valve positioned between the waste-side conduit and the vacuum-side conduit, wherein the waste receiving portion is configured to tilt, hinge, or slide away from the unit body in order to receive waste, wherein the received waste is transferred to the main waste tank via (a) opening of the flush valve, (b) creating vacuum between the waste-side conduit and the vacuum-side conduit in order to move waste therebetween, and (c) closing of the flush valve.

DETAILED DESCRIPTION

Figure 1:
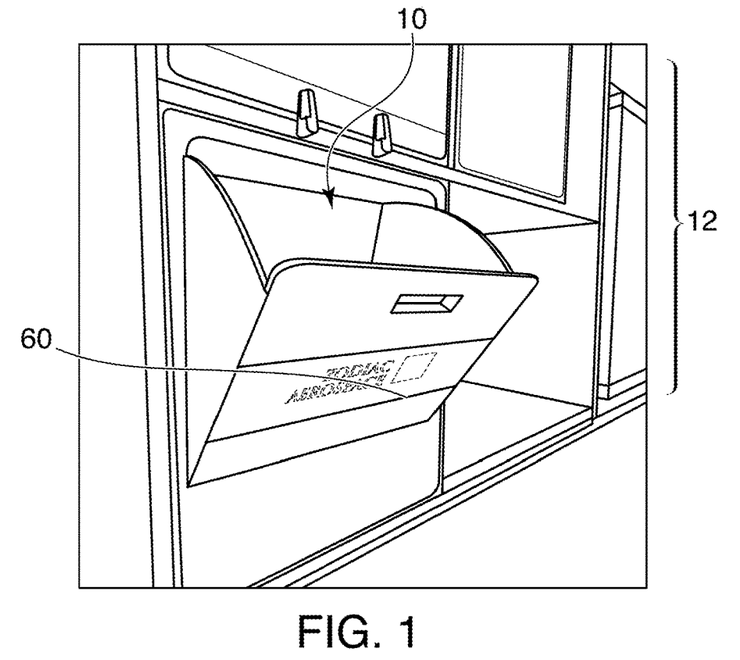
FIG. 1 shows a side perspective view of one embodiment of a waste transfer unit installed in an aircraft galley in an open configuration.

FIG. 1 illustrates one embodiment of a waste transfer unit 10. The unit 10 combines a traditional galley sink function (receiving liquid) with disposal functions (such as receiving food, various types of slurry, or solid waste). The unit 10 moves various types of waste from its location (in the galley or the lavatory or other location) into the vacuum waste system of an aircraft or other passenger transportation vehicle.

Figure 2:
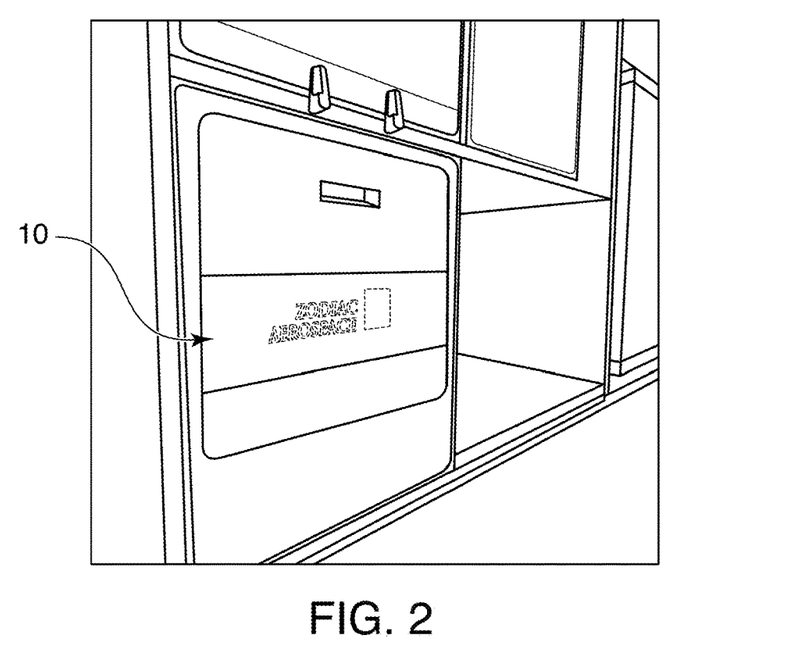
FIG. 2 shows the waste transfer unit of FIG. 1 in a closed configuration.

Referring now to FIG. 1, the waste transfer unit 10 is an integrated unit that does not require a specialized disposal sink. It does not take up any counter space or galley work desk space for disposal functions. As shown in FIGS. 1 and 2, the unit 10 can be mounted within an aircraft galley monument 12. In other words, the unit 10 is mounted with respect to the storage compartment area, rather than on the countertop surface.

One advantage of the disclosed unit 10 is that it may be retrofitted into an existing galley. The size of the unit 10 may correspond in size to a standard galley container compartment, offering flexibility on where the unit 10 can be installed. It should also be understood that the size may be enlarged or smaller, depending on airline requirements. In other words, the size of the unit in the face may be modified if desired. The face of the unit may also be color-coded or graphically designed in order to correspond, match, or otherwise fit in aesthetically with the decor of the galley or other location in which it is to be positioned. Flexibility is also provided because the unit 10 uses standard interfaces, as detailed further below. The unit 10 may also be removable, such that a new unit may be replaced (while the initial unit is sent out for repair or inspection) or such that the compartment in which the unit was stored may be used for storage or any other alternate purpose.

Figure 3A:
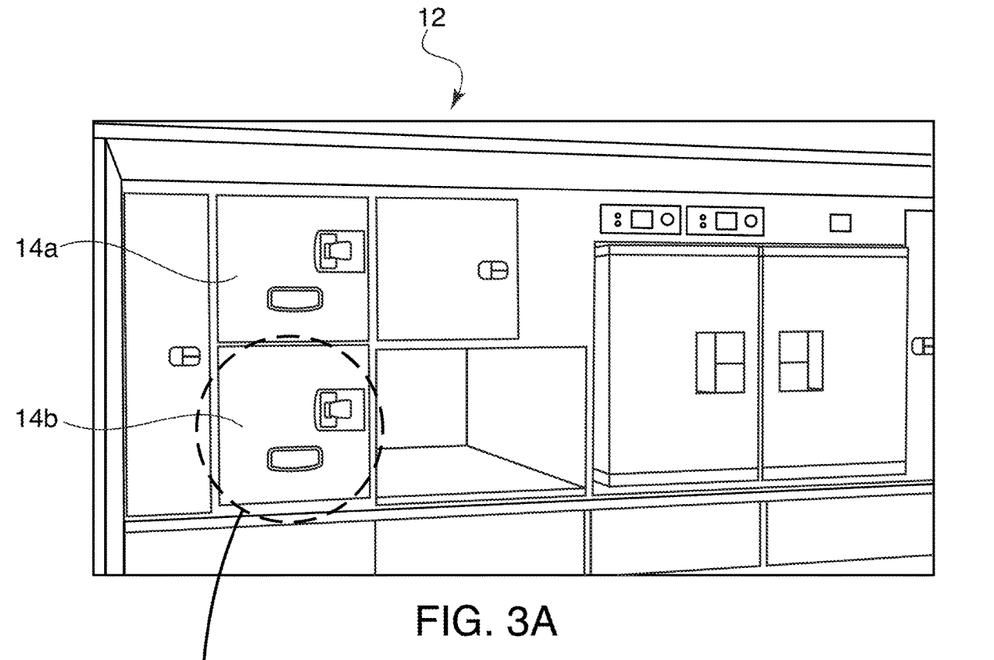
FIG. 3A shows a galley with upper and lower storage compartments filled with standard storage containers.
Figure 3B:
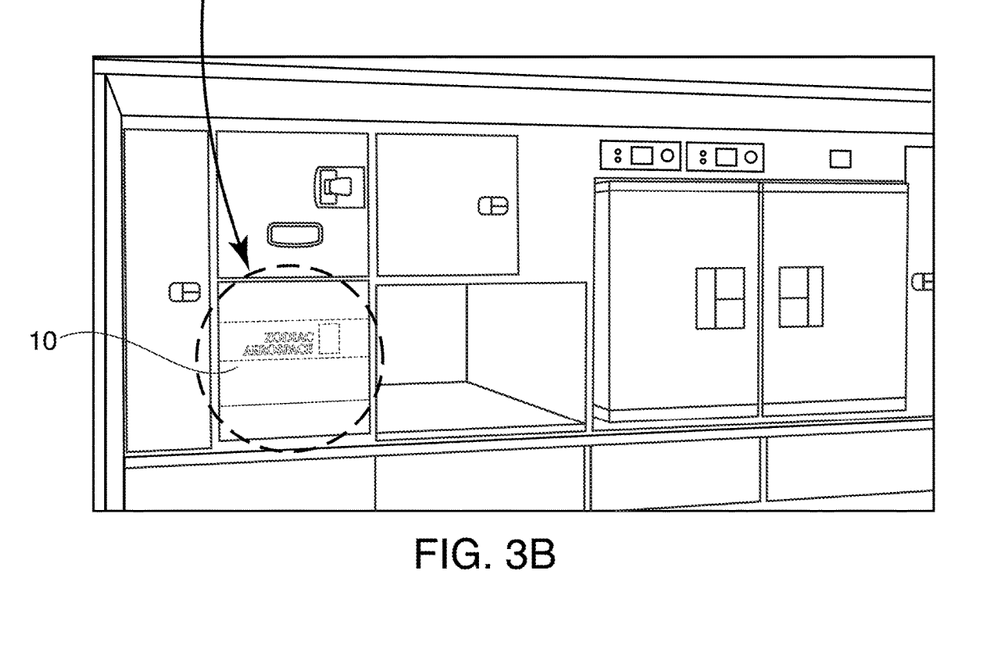
FIG. 3B shows the galley of FIG. 3A with the lower storage container replaced with a waste transfer unit.
Figure 4:
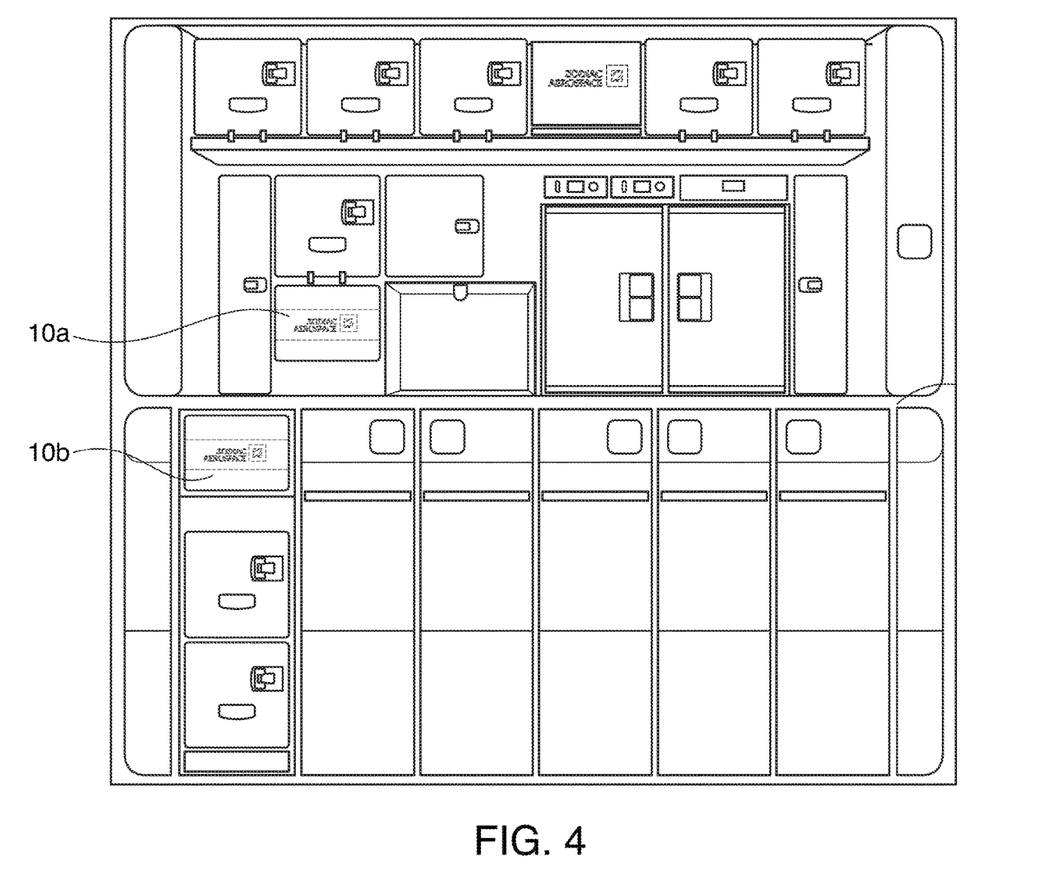
FIG. 4 shows a galley having two waste transfer units installed, one above the worktop space and one below the worktop space.

FIG. 3A illustrates an aircraft galley monument 12 having first and second containers 14a and 14b mounted in compartments therein. FIG. 3B illustrates one of the containers 14b removed, with a waste transfer unit 10 positioned in its place. This illustrates the modularity of the unit 10. FIG. 4 illustrates an aircraft galley monument 12 with a first unit 10a positioned above the countertop/work surface 16, and a second unit 10b positioned below the countertop/work surface 16, showing that the waste transfer unit 10 may be positioned in any desired and appropriately-shaped compartment. The unit may be positioned above or below the countertop/work surface, although some users may find ease-of-use with the unit being positioned below the surface 16.

Figure 5:
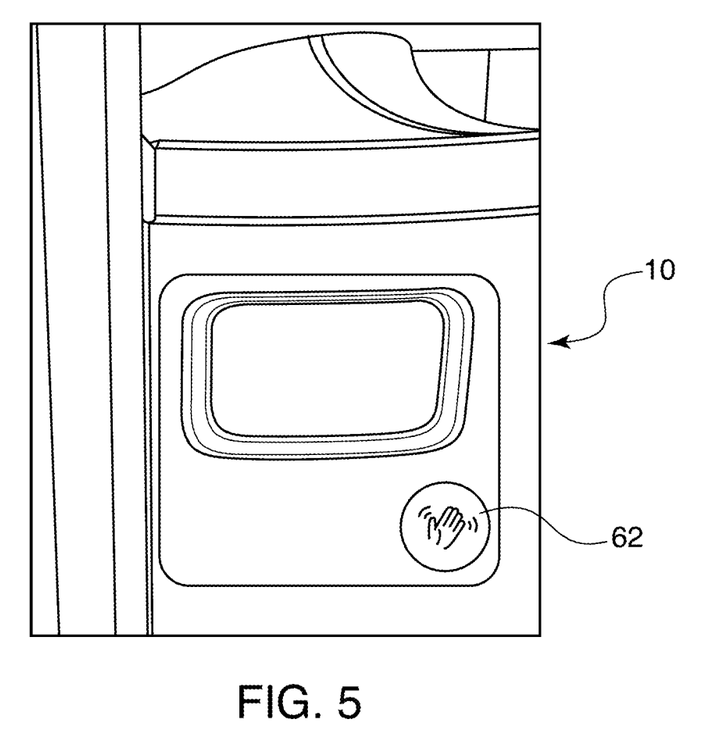
FIG. 5 shows a front perspective view of one embodiment of a waste transfer unit disclosed herein installed in a lavatory.

FIG. 5 illustrates a version of the waste transfer unit 10 that may be installed in a passenger transportation vehicle (such as an aircraft) lavatory. The unit 10 may be placed above or below the sink/countertop area. Providing a waste transfer unit 10 in vehicle lavatories may provide particular benefits by managing disposal of paper towels and other paper waste (which will typically be paper towels, tissues, feminine hygiene products, baby diapers, and the like). Overflowing waste bins in the lavatories have been reported as a problem, particularly on longer or international flights. Although not intended as the primary operation, however, it should also be understood that the disclosed waste transfer unit 10 can be used to manage and transport other types of lavatory waste, such as human waste, vomit, or any other types of liquid, mixed, or solid wastes that may be generated on-board.

FIG. 5 also illustrates an option for touchless operation, such that simply the presence of a user's hand in front of a sensor 62 or other appropriate vicinity in order to cause the door of the unit to open in order to receive waste. Additionally or alternatively, a handle or grip area 60 (as shown by FIGS. 1 and 2) may be used. The use and connection of the waste transfer unit 10 in a lavatory will generally be similar to the use and connection of the unit 10 in a galley or any other appropriate location.

Figure 6:
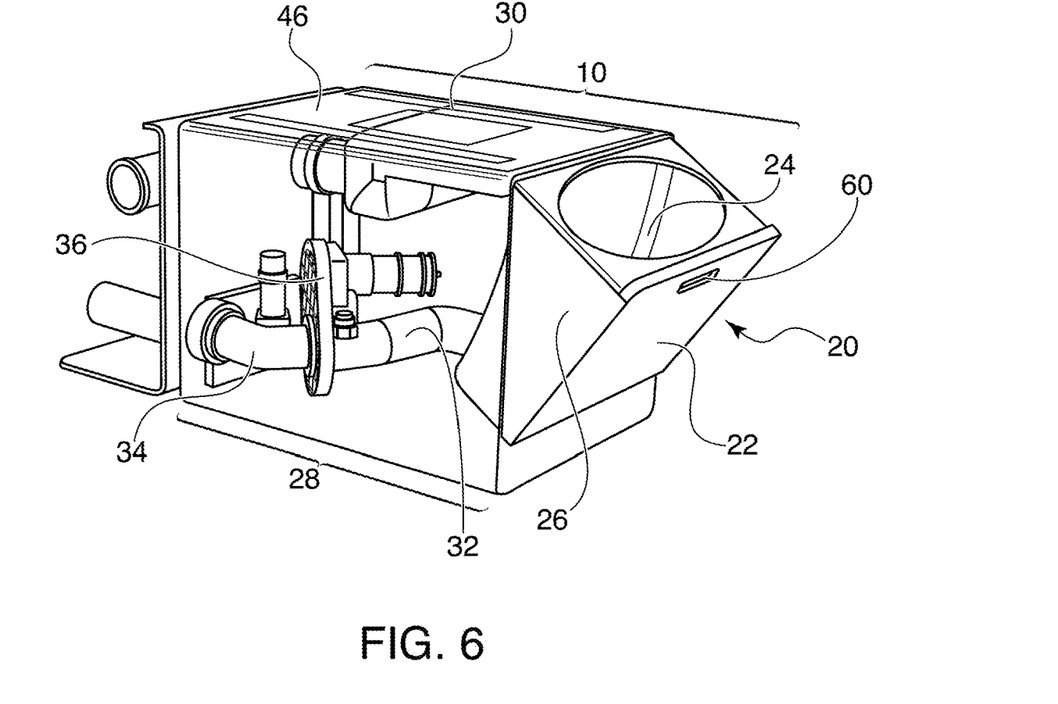
FIG. 6 a front/side cross-sectional perspective view of a waste transfer unit with the waste receiving portion in an open configuration.
Figure 7:
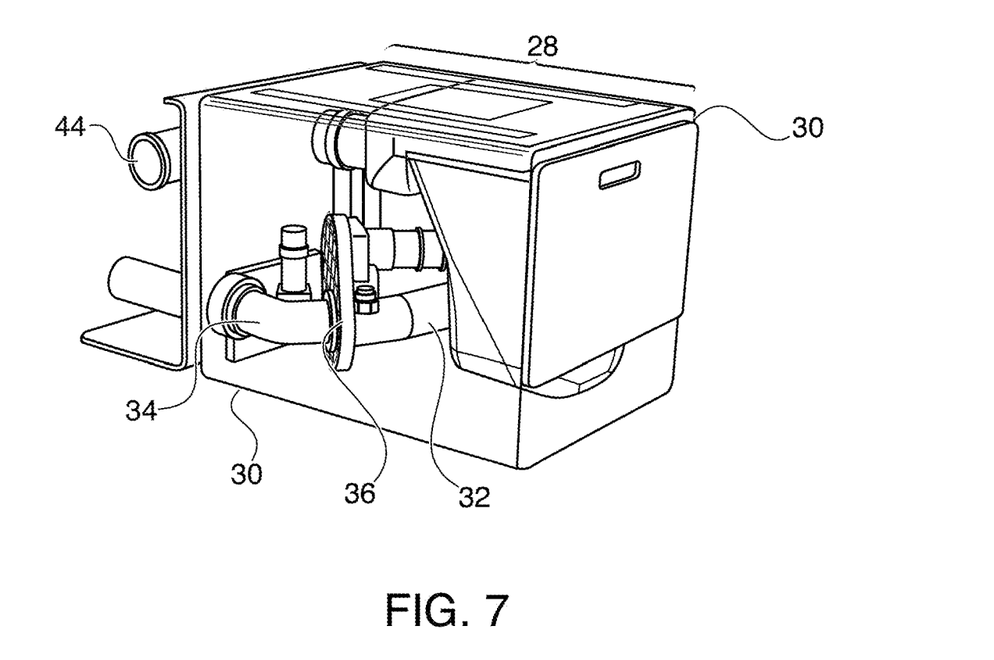
FIG. 7 shows the waste transfer unit of FIG. 6 in a closed configuration.
Figure 8:
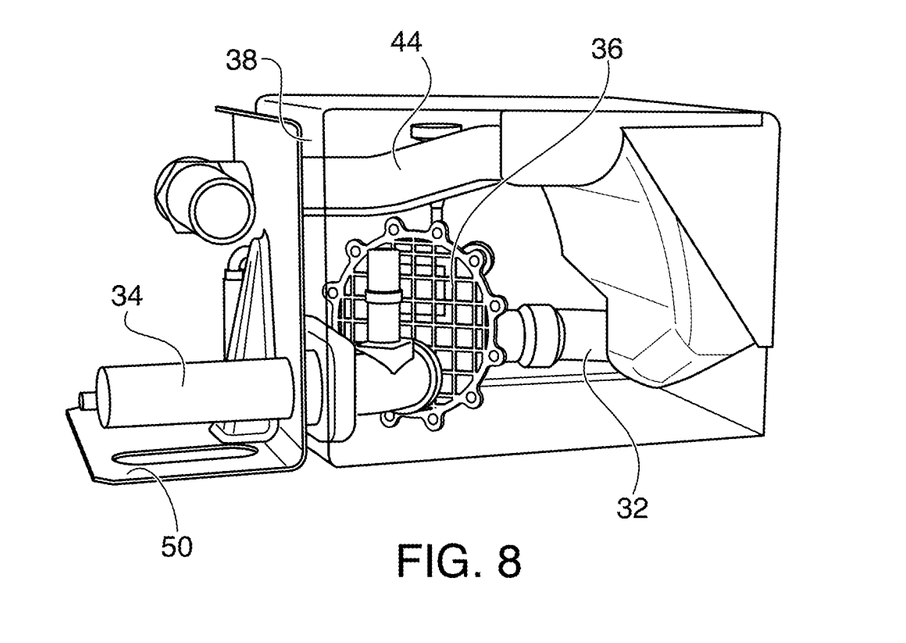
FIG. 8 shows a rear/side cross-sectional perspective view of the waste transfer unit of FIG. 6.

FIG. 6 illustrates a side perspective view of one embodiment of a waste transfer unit 10, positioned within a galley monument, lavatory, or other appropriate location. The galley walls are not shown for ease of viewing. This side view illustrates the waste receiving portion 20 in an open position. The waste receiving portion 20 includes a front face 22, an opening 24, and side wings 26 that help contain and direct waste into the opening 24. Front face 22 may have a handle or grip area 60 that allows a user to open and close the waste receiving portion 20. Additionally or alternatively, touchless operation is also possible. Touchless operation may be provided via a sensor 62 (shown on FIG. 5) in front of which a user may waive his or her hand in order to cause opening of the waste receiving portion 20.

Waste receiving portion 20 may be hinged with respect to the remainder of the unit body 28. This hinged connection may be via an actual hinge, or the waste receiving portion 20 may be designed to simply rotate or tilt out with respect to the unit body 28. In alternate embodiments, the waste receiving portion 20 may slide out from the unit body 28 in drawer-like fashion. One of ordinary skill in the art will understand alternate ways in which the waste receiving portion 20 may function.

When in an open position as shown by FIG. 6, the waste receiving portion 20 is configured for receiving any type of liquid waste, solid waste, or mixed waste. For example, opening 24 is sized to receive liquid waste that may be poured into the opening 24 (such as soda, coffee, water, etc.), soft food items (such as noodles, rice, coffee pads, unconsumed meal service items, etc.), or even dry waste (such as paper towels, tissues, napkins, etc.)

When the waste receiving portion 20 is closed, it may be set to automatically lock for safety. Closure of the waste receiving portion 20 may also initiate an automatic flush cycle as described below. Alternatively, the waste transfer unit 10 may be set to only flush upon manual activation. It is also possible for the flush cycle to be set at timed intervals. An alternate option is for this flush cycle to be set on a time delay, such as delaying a flush until a few seconds after the waste receiving portion 20 is closed. It is generally envisioned that a flush cycle will only occur, however, when the waste receiving portion 20 is closed.

As shown by FIGS. 1-4, the waste receiving portion 20, and particularly the front face 22, is the primary portion of the unit 10 that is visible from the front. The remainder of the components of unit 10 are contained within the unit body 28. As illustrated, the unit body 28 may have a housing 30 that encloses the additional components described. It should also be understood, however, that a housing is not required. It is possible to install the individual components within a aircraft compartment.

First, there is provided a waste-side conduit 32 in fluid communication with the opening 24. This conduit 32 has a diameter sufficient to receive any of the waste items described herein. In a specific example, the conduit 32 may have a diameter of about 1 to about 2 inches. Next, there is a vacuum-side conduit 34 in fluid communication with a vacuum source. This conduit 34 may have a diameter similar to the diameter of the waste-side conduit 32. However, it is possible for the vacuum-side conduit 34 diameter to differ from the waste-side conduit 32, depending upon system requirements. The diameters may remain generally constant throughout the conduits 32, 34. Alternatively, the diameters may be tapered in either direction. Positioned between the conduits 32, 34 is a flush valve 36. When the flush valve 36 is open, fluid communication is allowed between conduits 32, 34. When the flush valve 36 is closed, fluid communication between conduits 32, 34 is not allowed. The flush valve 36 may have features similar to vacuum toilet flush valves, many of which are described by patents and co-pending patent applications owned by the Assignee. Because details of the flush valve 36 may vary depending upon the waste transfer unit design, further details are not described herein. However, it should be understood that any appropriate vacuum toilet flush valve may be used in connection with this disclosure. Specific examples include but are not limited to U.S. Pat. Nos. 9,182,042 and 9,441,739, both titled "Mixed Media Orbital Valve"; U.S. Pat. Nos. 9,428,896 and 10,017,930, both titled "Multi-Port Orbital Valve"; U.S. Pat. No. 10,017,931, titled "Multi-Port Valve."

A portion of the vacuum-side conduit 34 may be housed within the unit body 28 as shown. Alternatively, it is possible for the flush valve 36 to be positioned along the rear wall 38 of the unit body 28 with the entirety of the vacuum-side conduit 34 positioned outside the unit body 28. The preferred design is dependent upon the plumbing architecture within the aircraft or other vehicle.

A flushing process will now be described. In one embodiment, when the waste receiving portion 20 is opened, the flush valve 36 remains closed so that fluid communication or cooperation between the waste-side conduit 32 and the vacuum-side conduit 34 remains closed. This prevents a loud whooshing vacuum sound from occurring when the waste receiving portion 20 is opened. (The flush valve will generally remain closed and only opens briefly during a flush. It is understood, however, that it is possible for the vacuum to remain open, but that is not generally the embodiment envisioned as preferable, for safety and noise generation reasons.) When the waste receiving portion 20 is closed and a flush of the waste transfer unit 10 is activated (whether automatically, manually, or via periodic set time), the flush valve 36 opens and allows fluid communication or cooperation between the waste-side conduit 32 and the vacuum-side conduit 34. Vacuum pulls waste from conduit 32 into conduit 34, and delivers the waste to a waste receiving tank. The flush function is similar to a flush function that takes place on board a passenger transportation vehicle. The vacuum may be generated by a vacuum generator (e.g., for an aircraft on the ground, for marine vessel, for a recreation vehicle, or other type of vehicle) or the vacuum a may be generated by differential pressure, which is created when an aircraft is at an appropriate altitude in flight.

Figure 9:
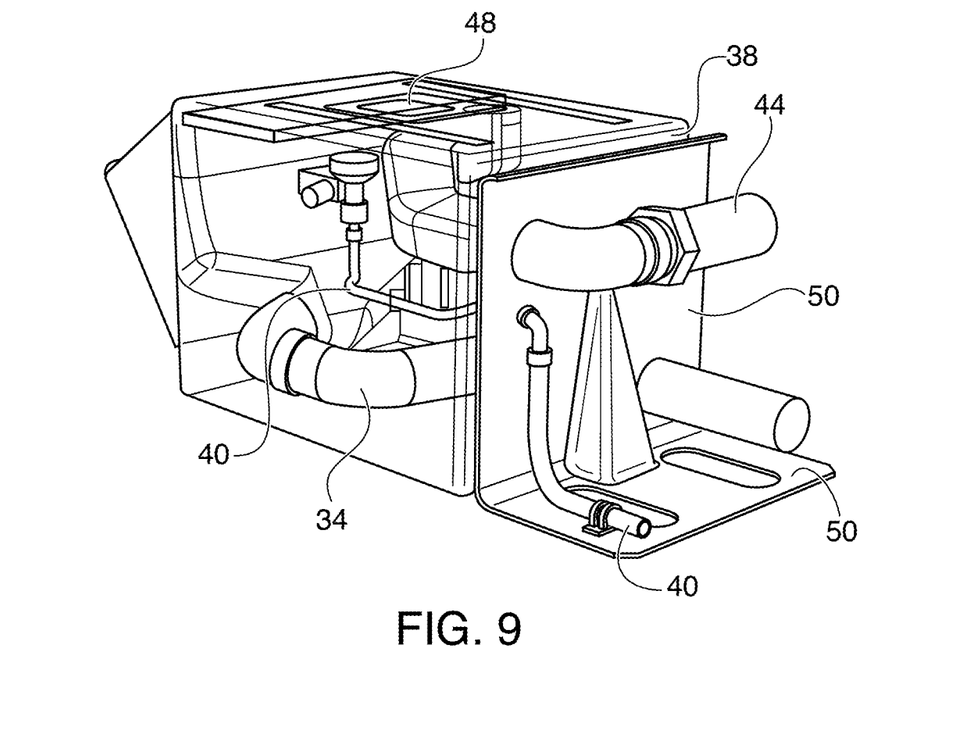
FIG. 9 shows a rear/side cross-sectional perspective view of the waste transfer unit of FIG. 6.

The waste transfer unit 10 may also be provided with a rinse function. The rinse function may be provided by a rinse line 40, shown most clearly by FIG. 9. The rinse line 40 enters the unit body 28 at a rear wall 38. At least a portion of the rinse line 40 may extend into the unit body 28 and is in fluid communication with at least a portion of the opening 24. When a flush is activated, fresh water or filtered grey water (which may be provided via any number of grey water cleaning systems, which are described by patents and co-pending patent applications owned by the Assignee) is delivered to the opening 24 via the rinse line 40. The general goal with the rinse function is to clean the side walls 42 of the opening 24 in order to prevent waste debris from sticking thereto. This can help maintain visual cleanliness of the waste transfer unit 10, minimize undesirable odors, and limit required cleaning and maintenance of the unit 10. Additionally or alternatively, at least a portion of the rinse line 40 may cooperate with one or both of the conduits 32, 34.

Figure 10:
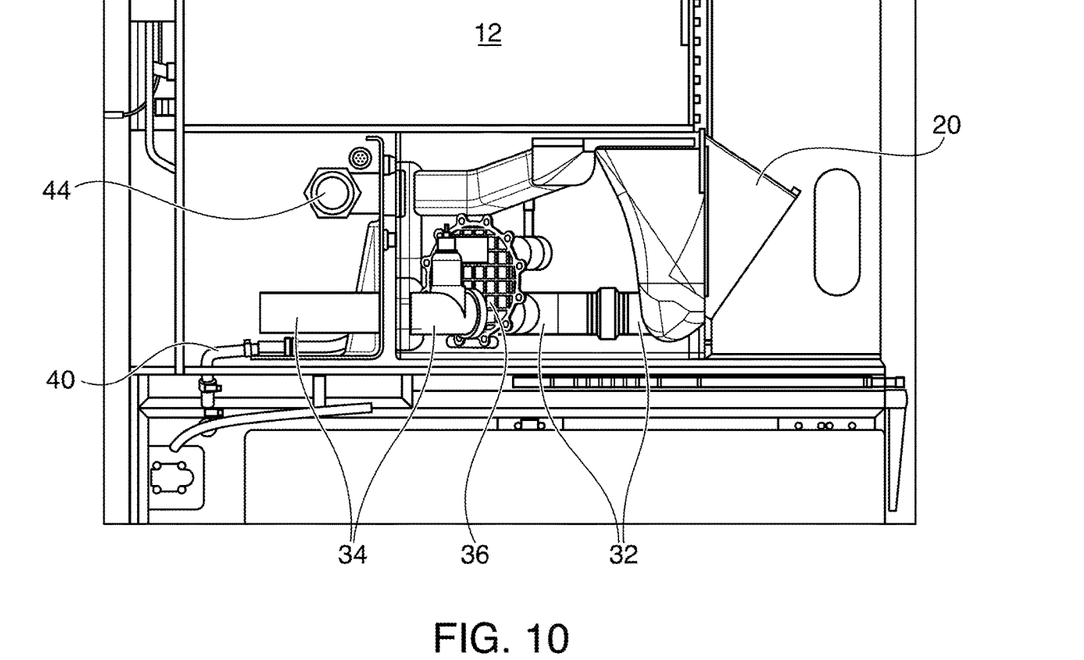
FIG. 10 shows a side plan view of the waste transfer unit of FIG. 6 installed in an aircraft galley.

A vent line 44 is also provided. The vent line 44 is provided to vent the vacuum within the vacuum-side conduit 34. FIG. 10 shows a side view of the waste transfer unit 10 installed in a galley. The rinse line 40 and the vacuum-side conduit 34 may be connected with vehicle water and waste lines. The vent 44 may be exposed to atmosphere or vent inside the housing. If desired, a muffler may be added to the end of the vent line in order to help muffle or minimize vacuum sound from exiting the unit 10.

Figure 11:
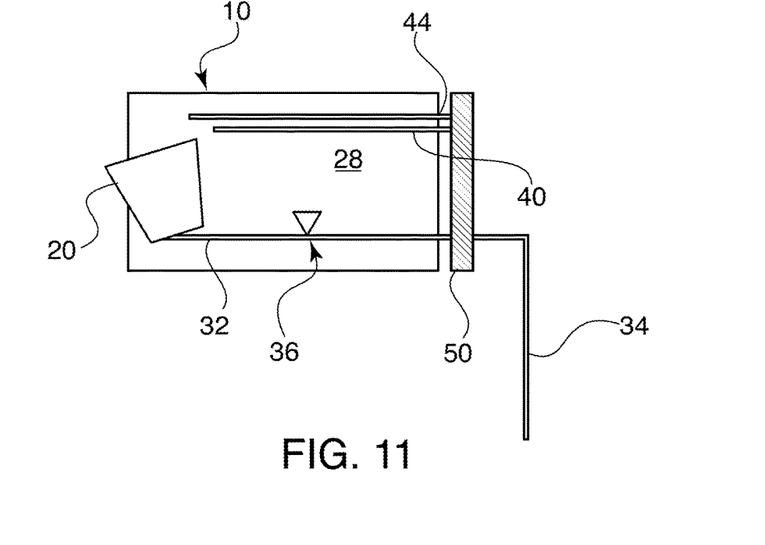
FIG. 11 shows a side plan view schematic of a waste transfer unit.

FIG. 11 provides a schematic view of these described components and their possible locations within the waste transfer unit. It should be understood, however, that alternate arrangements are possible and considered within the scope of this disclosure.

The upper wall 46 of the housing 30 may be provided with a handle 48. This allows for easy transport and placement of the waste transfer unit 10 into a designated compartment. The handle 48 may hinge down and lie flat so that it does not interfere with installation. Additionally, one or more attachment brackets 50 may be provided on the housing 30 in order to ease installation and help support any components that extend from rear wall 38.

In order to install the waste transfer unit 10, the rinse line 40 and the vacuum-side conduit 34 may be plumbed in line with the aircraft (or other vehicle) water and vacuum lines. The waste transfer unit 10 may also pull electrical power from the aircraft (or other vehicle) or it may be independently powered via battery, via fuel-cell, or via any other appropriate energy source.

If designed to be installed on board a passenger aircraft, all of the described components used are certified aerospace parts as designated by an appropriate regulatory authority. It is also desirable to use materials that are as light as possible, while also providing the required functions for longevity. Component materials include but are not limited to stainless steel, aluminum, polyethylene and/or other plastics, or any combination thereof. The opening 24 and its side walls 42 may be coated with Teflon or any other type of stain resistant surface.

Figure 12:
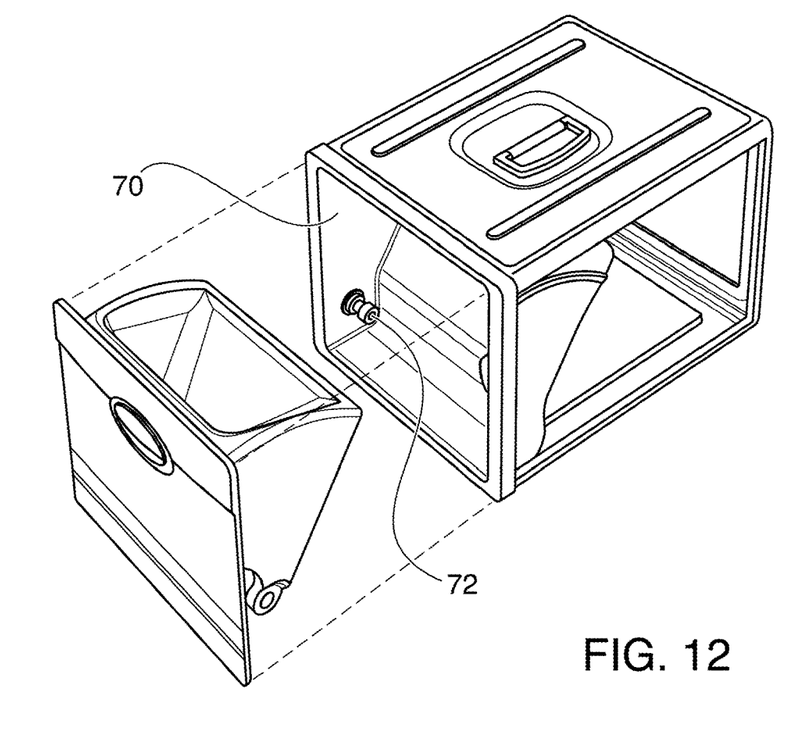
FIG. 12 shows an exploded perspective view of a waste transfer unit with a spill shroud positioned within the housing.
Figure 13:
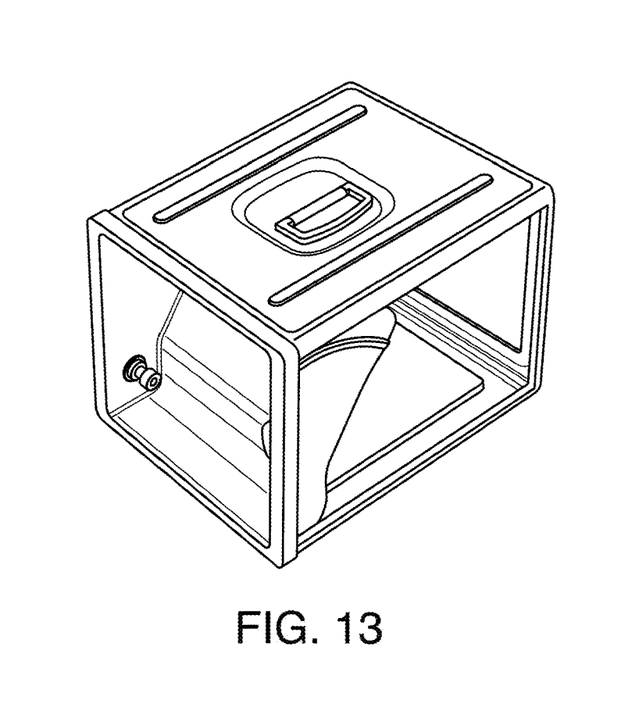
FIG. 13 shows a perspective view of a spill shroud assembled within the housing, prior to the waste receiving portion/door being positioned.

Additionally or alternatively, a spill shroud 70 may be positioned within the housing. This is illustrated by FIGS. 12 and 13. The waste receiving portion 20 may then be installed inside the spill shroud 70 in order to avoid spillage leaking into the back of the unit. The spill shroud may contain structural elements 72 to support the portion 20. The spill shroud may include provisions for air intake. The spill shroud may include provisions for lighting and/or disinfecting UV LEDs.

The system may also be provided with an indicator light that indicates to a user the status of the unit. For example, "ready for operation" may cause the indicator light to glow blue, "in use" may cause the indicator light to glow amber, and a failure of the unit may cause the indicator light to glow red. The indicator light may be positioned and caused to glow on or near or underneath the grip area 60. In other examples, the grip area or other areas of the unit may be caused to glow with an accent light for aesthetic appeal.

Changes and modifications, additions and deletions may be made to the structures and methods recited above and shown in the drawings without departing from the scope or spirit of the disclosure or the following claims.

What is claimed is:

1. A waste transfer unit configured to be installed above or below a sink or countertop area, comprising:
   a unit body comprising
   (a) a waste-receiving portion comprising an opening for receiving waste;
   (b) a waste-side conduit in fluid communication with the opening; and
   (c) a flush valve in fluid communication with the waste-side conduit when the flush valve is in its open position;
   wherein each of the waste-receiving portion, the waste-side conduit, and the flush valve are housed within the unit body;
   wherein the waste: receiving portion is configured to tilt, hinge, or slide away from the unit body in order to receive waste, and
   wherein the received waste is transferred to a main waste tank via vacuum through a vacuum-side conduit that is housed within the unit body or that is positioned outside the unit body,
   wherein closing of the waste-receiving portion automatically activates the flush valve or activates a periodic or delayed flush.

2. The unit of claim 1, wherein the unit body further encloses a vacuum-side conduit.

3. The unit of claim 2, wherein the flush valve is positioned between the waste-side conduit and the vacuum-side conduit.

4. The unit of claim 1, wherein the waste transfer unit is configured to be installed above or below a work surface.

5. The unit of claim 1, wherein the unit body further encloses a rinse line.

6. The unit of claim 1, wherein the unit body further encloses a vent line.

7. The unit of claim 1, wherein the waste receiving portion comprises a grip area.

8. The unit of claim 1, wherein the waste transfer unit comprises a sensor for touchless operation.

9. The unit of claim 1, wherein the waste transfer unit comprises an attachment bracket for installation.

10. The unit of claim 1, wherein the waste transfer unit comprises a handle on an upper wall for ease of transport of the unit.

11. The unit of claim 1, wherein the vacuum is generated by differential air pressure on an aircraft.

12. The unit of claim 1, wherein the vacuum is generated by a vacuum generator.

13. The unit of claim 1, installed on board a passenger aircraft.

14. The unit of claim 1, wherein the unit body comprises a housing.

15. The unit of claim 1, further comprising a spill shroud.

16. A waste transfer unit configured to be installed above or below a sink or countertop area, comprising:
   a unit body comprising (a) a waste receiving portion comprising an opening for receiving waste; and
   (b) a waste-side conduit in fluid communication with the opening and (c) a flush valve in fluid communication with the waste-side conduit when the flush valve is in its open position;
   wherein each of the waste-receiving portion, the waste-side conduit, and the flush valve are housed within the unit body;
   wherein the waste-receiving portion is configured to tilt, hinge, or slide away from the unit body in order to receive waste,
   wherein closing of the waste receiving portion creates an automatic lock between the unit body and the waste receiving portion until a flush has completed.

17. The unit of claim 16, wherein the unit body further encloses a vacuum-side conduit.

18. The unit of claim 17, wherein the flush valve is positioned between the waste-side conduit and the vacuum-side conduit.

19. The unit of claim 16, wherein the waste transfer unit is configured to be installed above or below a work surface.

20. The unit of claim 16, wherein the unit body further encloses a rinse line.

21. The unit of claim 16, wherein the unit body further encloses a vent line.

22. The unit of claim 16, wherein the waste receiving portion comprises a grip area.

23. The unit of claim 16, wherein the waste transfer unit comprises a sensor for touchless operation.

24. The unit of claim 16, wherein the waste transfer unit comprises an attachment bracket for installation.

25. The unit of claim 16, wherein the waste transfer unit comprises a handle on an upper wall for ease of transport of the unit.

26. The unit of claim 16, wherein the vacuum is generated by differential air pressure on an aircraft.

27. The unit of claim 16, wherein the vacuum is generated by a vacuum generator.

28. The unit of claim 16, installed on board a passenger aircraft.

29. The unit of claim 16, wherein the unit body comprises a housing.

30. The unit of claim 16, further comprising a spill shroud.

* * * * *